United States Patent [19]

Hakansson

[11] Patent Number: 4,597,869
[45] Date of Patent: Jul. 1, 1986

[54] PLATE PACK FOR AN INCLINED PLATE SEPARATOR

[75] Inventor: Sven Hakansson, Nynashamn, Sweden

[73] Assignee: Axel Johnson Engineering AB, Nynashamm, Sweden

[21] Appl. No.: 693,274

[22] Filed: Jan. 22, 1985

[30] Foreign Application Priority Data

Jan. 23, 1984 [SE] Sweden .................. 8400333

[51] Int. Cl.⁴ .................. B01D 21/02
[52] U.S. Cl. .................. 210/232; 210/521
[58] Field of Search .................. 210/521, 522, 232

[56] References Cited

U.S. PATENT DOCUMENTS

| | | | |
|---|---|---|---|
| 3,852,199 | 12/1974 | Wachsmuth | 210/522 |
| 4,028,256 | 6/1977 | Pielkenrood | 210/522 |
| 4,400,280 | 8/1983 | Larsson et al. | 210/521 |
| 4,405,459 | 9/1983 | Smith | 210/521 |

FOREIGN PATENT DOCUMENTS

| | | |
|---|---|---|
| 1571937 | 2/1969 | France . |
| 340612 | 11/1971 | Sweden . |
| 1378323 | 12/1974 | United Kingdom . |

*Primary Examiner*—John Adee
*Attorney, Agent, or Firm*—Brumbaugh, Graves, Donohue & Raymond

[57] ABSTRACT

In the particular embodiment of the invention described in the specification, a plate pack for an inclined plate separator has plate support members forming the side walls of the separator in which the separation plates are received in grooves formed by converging tongues. The support members are releasably joined together edge to edge by a bead projecting from one edge of the support member and a groove formed in the adjacent edge of the next supporting member.

8 Claims, 3 Drawing Figures

PLATE PACK FOR AN INCLINED PLATE SEPARATOR

BACKGROUND OF THE INVENTION

The present invention relates to a plate pack for an inclined plate separator.

In conventional inclined plate separators, the separation of sediment from a suspension or of liquids in an emulsion is accomplished by supplying the suspension or emulsion to a plurality of separation passages formed between a plurality of parallel, spaced apart plates, all inclined with respect to a horizontal plane, usually at an angle of about 45°–60°. In the most common embodiments of inclined plate separators, the suspension or emulsion enters the separation passages laterally. The sediment in the suspension or the heavier liquid in the emulsion sinks downwardly in the separation passages, flows past the lower edges of the plates, and is removed at the bottom of the separation apparatus, while the remaining liquid flows upwardly and is eventually discharged through outlets at the upper ends of the plate passages.

The influent suspension or emulsion is usually supplied to the separation passages through a distributor positioned close to the plates so that the influent is allowed to flow from the distributor into the passages between the plates. Preferably, the distributor is positioned laterally of a plate pack or between two plate packs and is provided with side walls, so that the influent is forced downwardly and enters the passages between the plates at some distance below the top edges of the plates. The influent enters the distributor through an inlet from the top, or preferably, from the side of the distributor.

In order to cover the sides of the separation passages to hold the plates in the plate pack in spaced relation to each other, the plate pack has side walls consisting of a series of plate support members, usually one for each separation passage. According to prior art arrangements, these support members usually have an I-shaped configuration. The plates are fixed to at least one of the support members usually by glueing, and the height of the I-shape accordingly fixes the distance between plates in the plate pack. In a separator provided with a distributor, as described above, the side wall of the plate pack facing the distributor can form the side wall of the distributor and this side wall is then formed with openings for allowing the suspension or emulsion to flow into the separation passages.

In such arrangements, the glueing of the separation plates to the support members is an uncertainty factor and the glue joint is a region of weakness. The stress on the glued surfaces is great. Certain plate materials are also difficult to glue. Moreover, glueing is a health risk and is an expensive method. Another substantial disadvantage is that skewness in the plate pack can be caused by uneven plate thickness if the thickness variations of the plates accumulates along one side of the pack. Such a skewness can result in an uneven flow of the suspension or emulsion through the separator and may cause difficulties when mounting the plates.

SUMMARY OF THE INVENTION

These difficulties of the prior art are overcome, in accordance with the present invention, by providing a plate pack having a plurality of plate support members which are joined together to form the side walls of the plate pack, in which the plate support members are formed with a groove having a narrow position in which the width of the groove is less than the thickness of the plate and in which the plate support members are formed with cooperating fastening elements to hold adjacent plate members together. With this arrangement the above mentioned problems have been eliminated. The invention thus furnishes a plate pack having plates which do not require glueing for their fastening, and thickness variations of the plates do not influence the total linear measure of the plate pack. Moreover, a considerably more simple and cheaper mounting of the plates to a plate pack is achieved. The support members can also be easily connected to each other to form the side walls of the plate pack as well as easily disconnected from each other when required.

BRIEF DESCRIPTION OF THE DRAWINGS

For a better understanding of the invention, reference is made to the following detailed description taken with reference to the accompanying drawings, in which.

DESCRIPTION OF PREFERRED EMBODIMENTS

Figure 1:
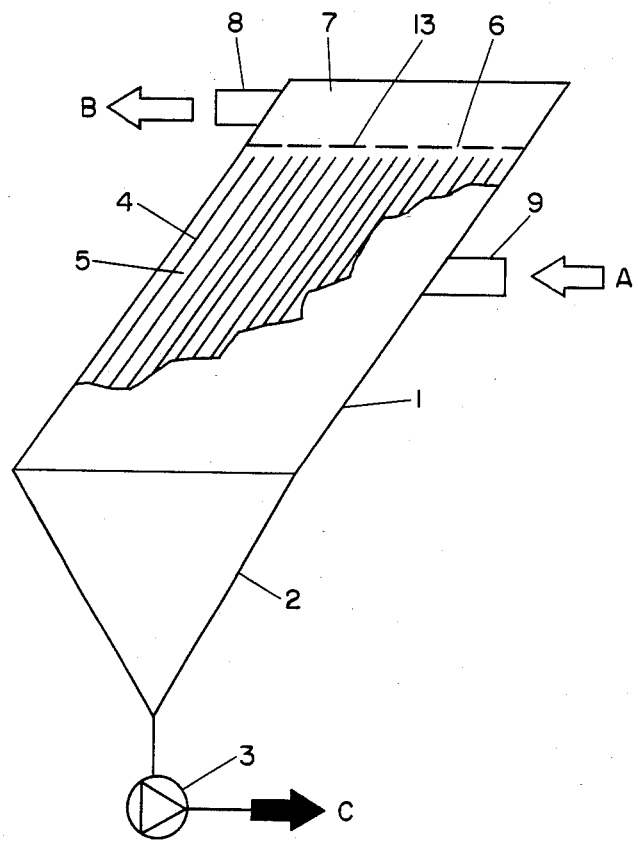
FIG. 1 is a side view of an inclined plate separator, partially broken away to illustrate a portion of a plate pack in the separator.
Figure 2:
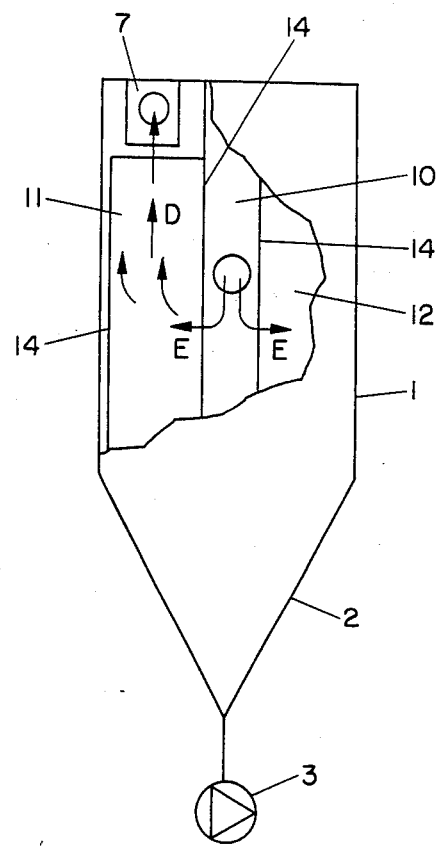
FIG. 2 is an end view, partially broken away, of the inclined plate separator of FIG. 1, as viewed from the left in FIG. 1.

As shown in FIGS. 1 and 2, a representative inclined plate separator has a separation chamber 1 and an outlet portion 2 comprising a funnel-shaped trough into which separated liquid or sediment descends and is pumped out by a conventional pump means 3 as indicated by the arrow C. Mounted in the separation chamber 1 are a plurality of parallel, spaced-apart plates 4 which are inclined to the horizontal and form separate separation passages 5 therebetween.

Separation takes place in each separation passage 5, independently of the other separation passages, in such manner that the solid particles in a suspension or the heavier liquids in an emulsion sink to the upper surface of the lower plate in each passage and thereafter slide down along that surface to the trough. The clarified liquid ascends adjacent to the upper plate in each passage 5, as indicated by the arrows D in FIG. 2, and flows out through openings 6 in a horizontal plate 13 at the upper ends of the plates 4 to enter a channel 7 positioned in the upper portion of the separator. The channel 7 is provided with an outlet opening 8 for discharge (arrow B) of the clarified liquid from the inclined plate separation apparatus.

An influent composite liquid, such as a suspension or emulsion, is supplied (arrow A) to the inclined plate separation apparatus through an inlet 9 to a distributor 10 which extends between two plate packs 11 and 12. A channel 7 is positioned above each plate pack and the influent flows through openings (not shown) in the side walls of the distributor laterally into the packs 11 and 12 as illustrated by the arrows E.

Figure 3:
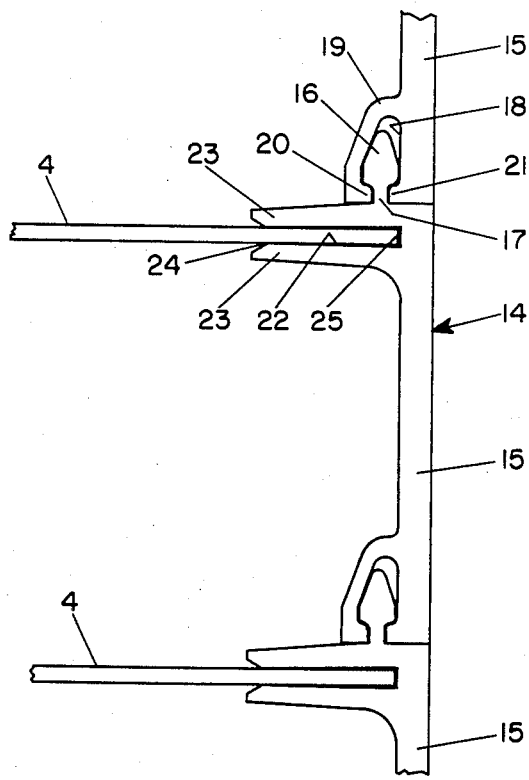
FIG. 3 is an enlarged fragmentary view, illustrating a representative plate support arrangement for forming a side wall of the plate pack and for holding the plates in accordance with the invention.

To cover the sides of the separation passages and also to hold the plates 4 in spaced relation, the plate packs 11 and 12 have side walls 14, a portion of which is shown in FIG. 3. The inner side wall 14 is, in the embodiment illustrated in FIGS. 1 and 2, shown as being the side wall of the distributor 10. As illustrated in FIG. 3, the side wall 14, made in accordance with the invention, consists of a plurality of plate support members 15. In the illustrated embodiment each support member 15 is provided along its edges with a fastening arrangement for sealingly joining the support members together edge to edge. As shown, the fastening arrangement includes a bead 16 having a waist 17 formed along one edge of the support member. Along the opposite edge the fastening arrangement consists of a groove 18 formed by a lip 19 projecting from the support member. The free end of the lip 19 is formed with a projection 20 and opposite this projection the support member is formed with a shoulder 21.

When fastening two support members together, the grooved edge of one support member is pressed straight over and on the beaded edge of the other support member. The lip 19 elastically yields to permit the widest portion of the bead 16 to pass and then the projection 20 snaps into the waist 17 and the shoulder 21 enters the opposite side of the waist. The projections 20 and 21 in engagement with the bead waist 17 therefore lock the support members together. To separate the support members from each other, the members can be moved relative to each other in the longitudinal direction. From a strength point of view it is preferred that the bead 16 and the groove 18 extend along the whole length of the support members 15.

The support members 15 are also provided with a fastening arrangement for holding the plates 4. That fastening arrangement consists of a slot 22 between two tongues 23 projecting from the support member. The tongues 23, like the bead 16, and the groove 18, preferably extend along the whole length of the support member. The size of the slot 22 should be adapted to the thickness of the plate 4 so that the plate, after it has been inserted into the slot, does not by its own weight slide out of the slot. This is, in the illustrated embodiment, accomplished by forming the slot so that it diverges inwardly from a gap 24 at the slot opening which is slightly less than the plate thickness. Since the support member is preferably made of a material which is somewhat elastic, the tongues 23 will press against the plate 4 and thereby hold it firmly. Moreover, by forming the slot 22 diverging inwardly towards the bottom 25 of the slot it is possible to insert therein plates which have variations in thickness. If, for instance, the plates to be used have a variation between 1.5 to 2.0 mm in thickness, the slot 22 is formed such that the slot opening 24 is somewhat less than 1.5 mm, for instance 1.3 mm, and the slot bottom 25 is at least 2.0 mm wide.

The support members 15 should be made of a material having an elasticity such that the tongues 23 and the lips 19 can satisfy the elastic function as described above. One such material is polyvinyl chloride (PVC) but many other materials having similar qualities are available.

Support members according to the present invention simplify considerably the mounting of plates in a plate pack for an inclined plate separator. The mounting can be carried out at the location of the separator and the transportation to that location is simplified by packing the plates and support members separately. The plates and the support members are mounted in a simple way to the plate pack, for instance only by the use of a rubber mallet. No glueing is required. The distance between the plates is kept equal on both sides of the plate pack, thereby obtaining an even flow of the suspension or emulsion through the separator. As mentioned above, the suspension or emulsion is often supplied laterally to the separation passages. In such a separator, the support members are formed with a number of holes through which the supply of the suspension or emulsion can take place. The size of the holes can be selected according to the type of suspension or emulsion to be separated and the support members can easily be replaced by members having different holes, if required.

The invention is not limited to the embodiments described above but is intended to encompass all modifications in form and detail falling within the scope of the following claims. Thus, the fastening arrangement along the edges of the support members can be formed in any other appropriate way to provide the desired connection between the members. The slot does not need to be positioned adjacent one edge of the support member (the bead edge as shown) but can be positioned elsewhere between the fastening elements. The slot does not need to be diverging as described, even if such a form is preferred, but can be formed in any other way in order to firmly hold plates with varying thickness. Furthermore, the support members can have a width that covers more than one separation passage.

I claim:

1. A plate pack for an inclined plate separator comprising a plurality of spaced-apart substantially parallel plates inclined to the horizontal and forming a plurality of separation passages therebetween; a plurality of plate support members covering the sides of the separation passages; the plate support members having substantially the same inclination as the plates and being joined together by fastening means, formed along the inclined edges of the support members, so as to form the opposite side walls of the plate pack; the plate support members being provided with at least one slot extending at the inclination of the plates, the slot having elastically resilient side walls and having in the depth direction of the slot at least one narrow portion with a separation between the side wall surfaces which is less than the plate thickness.

2. A plate pack according to claim 1 wherein the narrow portion of the slot is positioned at the slot opening.

3. A plate pack according to claim 2 wherein the slot has a diverging cross section from the slot opening towards the slot bottom.

4. A plate pack according to any of the claims 1-3 wherein the slot is formed between two tongues projecting from the support member.

5. A plate pack according to claim 1 wherein the fastening means includes a snap joint between adjacent support members.

6. A plate pack according to claim 5 wherein the fastening means comprises a bead extending along one of the support members and a groove extending along the adjacent support member.

7. A plate pack according to claim 6 wherein the bead is formed with a waist and the groove is formed by a curved lip projecting from the support member, the free end of the lip being received in the waist.

8. A plate pack according to claim 7 wherein the fastening means includes a shoulder projecting from the support member opposite to the free end of the lip.

* * * * *